Patented June 18, 1935

2,005,712

UNITED STATES PATENT OFFICE 2,005,712

ORGANIC FLUORINE COMPOUNDS AND PROCESS FOR THE PRODUCTION THEREOF

Lee Cone Holt, Edgemoor, and Edwin Lorenzo Mattison, Richardson Park, Wilmington, Del., assignors to Kinetic Chemicals Inc., Wilmington, Del., a corporation of Delaware No Drawing. Application August 31, 1932, Serial No. 631,123

30 Claims. (Cl. 260—160)

This invention relates to carbon compounds, more particularly organic fluorine compounds, and a process for the production thereof.

It is an object of the invention to produce compounds containing one or more acyclic carbon atoms having attached thereto an aryl group and one or more fluorine atoms. A further object is to produce aryl compounds having side chains comprising acyclic carbon atoms in which are substituted fluorine as well as other halogen atoms. Another object is the production of ring halogenated aryl derivatives containing aliphatic side chains in which one or more fluorine atoms are present. A still further object is the provision of a new and improved process for producing compounds of the character above described. Other objects will appear hereinafter.

These objects are accomplished according to the invention whereby organic fluorine compounds are produced by reacting a fluorinating agent with a compound containing one or more acyclic carbon atoms having attached thereto an aryl group and one or more halogen atoms other than fluorine in the presence of a catalyst such as a phosphorus halide.

While the invention is susceptible of considerable variation and modification in the manner of its practical application, particularly as regards the nature and proportions of the reactants, the catalyst and the exact method of procedure, the following examples, in which the parts are by weight, will illustrate how the invention may be practiced. For the construction of the equipment various metals, such as iron, steel, Monel metal or copper, may be used.

Example I

About 50 parts of phosphorus pentachloride were mixed with 541 parts of benzo-trichloride and about 360 parts of gaseous hydrogen fluoride passed into the mixture with agitation at a temperature of about 20°–25° C. A product was obtained which contained benzo-fluoro-dichloride, benzo-chloro-difluoride and benzo-trifluoride.

Example II

About 391 parts of a product consisting substantially of benzo-trichloride, prepared by chlorinating toluene with phosphorus pentachloride at a temperature of about 190–200° C., until substantially all the benzal chloride was eliminated (specific gravity 1.39–1.40) and then distilling the chlorination product, were placed in a deep and relatively narrow iron reaction tube. To this product was then added about 2 parts of antimony fluoro-chloride, prepared by passing gaseous hydrogen fluoride into antimony pentachloride until a solid compound having a melting point of about 40° C. formed. A stream of substantially anhydrous hydrogen fluoride was passed into the reaction mixture, with agitation, from the bottom of the tube at a rate of about 60 parts per hour. The evolution of hydrogen chloride was slow and much hydrogen fluoride passed through the reaction mixture unchanged. After a period of about fifteen minutes, 2 parts of phosphorus pentachloride were added and at once the absorption of hydrogen fluoride improved and there was a marked increase in the evolution of hydrogen chloride, indicating increased fluorination. The passage of hydrogen fluoride gas was continued until the evolution of hydrogen chloride had largely ceased.

The gases evolved from the surface of the reaction liquid during the reaction were absorbed in water and the small amount of organic oil, which separated out, was added to the main reaction mass. The resultant product was poured into a caustic soda solution of about 10–15% concentration. This mixture was then steam distilled, the distillate containing about 250 parts of a clear, pleasant smelling liquid, denser than water and water-insoluble. On fractionally distilling this product about 229 parts of substantially pure benzo-trifluoride were recovered at a temperature of about 100 to 105° C. (benzo-trifluoride has a boiling point of about 102.5° C.). The higher boiling residue contained small amounts of benzo-trifluoride, benzo-difluoro-chloride and ring-chlorinated benzo-trifluoride.

Example III

About 391 parts of crude benzo-trichloride, obtained from the chlorination of toluene in the presence of phosphorus pentachloride as in Example II but without distilling the product, were added to 1.5 parts of antimony fluoro-chloride catalyst prepared as described above. Since the benzo-trichloride was not distilled it contained some phosphorus pentachloride but in an unknown amount. It has a specific gravity of 1.395 at 25° C. indicating substantial absence of benzal chloride and the presence of some ring-chlorinated benzo-trichloride.

Gaseous hydrogen fluoride was passed into the resultant mixture with agitation at a temperature of about 20° C. and at a rate of about 60 parts of hydrogen fluoride per hour. There was an immediate and rapid evolution of hydrogen chloride and when this ceased the reaction mass was warmed to a temperature of about 60° C. to drive out excess gaseous acids. The gases evolved during the reaction were dissolved in water and the organic oil which collected in the water were added to the main reaction mass. The resultant product was poured into a caustic solution of about 10–15% concentration and this mixture was steam distilled whereby about 243 parts of crude benzo-trifluoride were obtained, which is a yield of about 83.2%. The product, on fractional distillation, gave about 218 parts of benzo-trifluoride, the residue being apparently ring chlorinated benzo-trifluoride.

*Example IV*

Ring chlorinated benzo-trichloride was prepared by the chlorination of ortho-chlor-toluene in the presence of phosphorus pentachloride until the specific gravity of the mixture was 1.52 at 24° C. About 340 parts of the crude product containing phosphorus pentachloride were mixed with about 15 parts of an antimony fluoro chloride prepared as described in Example II. About 120 parts of hydrogen fluoride were then passed into this mixture. The resultant product was poured into a caustic solution of about 10–15% concentration. The gases evolved during the reaction were absorbed in water and the organic oil which collected in the water was added to the main reaction mass. This mixture was steam distilled and the product obtained subject to fractional distillation. There was isolated ortho-chloro-benzo-trifluoride, having a boiling range of 151–152.5° C.

*Example V*

Three hundred ninety-one parts of benzo-trichloride, 4 parts of phosphorus pentachloride and 2 parts of antimony fluoro-chloride which was prepared as described in Example II were placed in a copper reaction tube. Gaseous hydrogen fluoride and chlorine were passed into the resultant mixture at room temperature. Hydrogen chloride was evolved. The reaction mass was steam distilled from caustic soda solution and the dense insoluble oil was separated and dried over calcium chloride. The material distilled between 112° and 143° C. and contained a white liquid, denser than water and of a mild odor, having a boiling point of about 138° C. This product has the formula:

Cl.C₆H₄CF₃

*Example VI*

One hundred and ten parts of 2 chloro-1:3-dimethyl benzene, which was prepared from 2-amino-1:3-dimethyl benzene by the Sandmeyer Reaction, were chlorinated in the presence of 2 parts of phosphorus pentachloride by passing a stream of dry chlorine through the mixture at a temperature ranging from 165° C. at the start to 245° C. at the finish. The exhaustively chlorinated body solidified on cooling to room temperature. Analysis showed this product to consist largely of a new compound having the general formula:

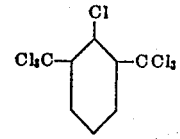

The above described product was remelted by heating to 90° C. and poured into a copper reaction tube maintained at 90° C. Five parts of phosphorus pentachloride were added and hydrogen fluoride was passed through the mixture. Hydrogen chloride was evolved. The temperature was slowly allowed to drop as the fluorination proceeded since the freezing point of the mixture is lowered by the formation of fluoro derivatives. At 55° C., 10 parts of antimony catalyst prepared as described in Example II were added. Hydrofluoric acid was added until the evolution of hydrogen chloride ceased. The reaction mass was steam distilled from caustic soda solution and the oil separated, dried and fractionated. The fluorinated body was a white liquid denser than and insoluble in water and boiling at 155°–160° C. This product, which is apparently a new compound, has the general formula

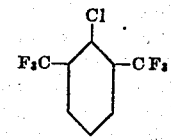

The invention is generally applicable to the production of organic fluorine compounds from compounds containing one or more acyclic carbon atoms having attached thereto an aryl group and one or more halogen atoms other than fluorine. As examples of compounds which may be fluorinated in accordance with the invention may be mentioned benzo-trichloride, halogenated xylenes such as, for example, chloro-1,3-di-(trichloromethyl) benzenes (prepared by suitable chlorination of meta-xylene, cf. Example VI), benzo-fluoro-chloride, benzo-fluoro-dichloride and benzo-trichloride derivatives having substituent groups or atoms as for example alkyl, chlorine and/or bromine in the aryl portion thereof. In fluorinating compounds of the character last mentioned, it has been noted that the chlorine atoms in the acyclic portion may be replaced by fluorine without affecting chlorine atoms in the aryl portion (cf. Example IV). It will be understood that the operating conditions may vary widely depending largely upon the nature of the compounds subjected to fluorination and the results desired. While halogens other than fluorine (including chlorine, bromine and iodine) attached to acyclic carbon atoms of aryl derivatives may be replaced by fluorine in accordance with this invention, the process has thus far been particularly advantageous in the fluorination of aralkyl derivatives containing chlorine in the side chain.

The phosphorus halide preferably employed as a catalyst in accordance with the invention is phosphorus pentachloride. It will be understood that other phosphorus halides such as, for example, phosphorus trichloride, phosphorus tribromide and phosphorus pentabromide may be employed. The results obtained have been especially desirable where both a phosphorus halide, such as phosphorus pentachloride, and an antimony halide were employed as catalysts. The antimony halide used is preferably in the pentavalent form and is preferably such a composition as may be represented by the empirical formula

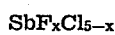

$$SbF_xCl_{5-x}$$

in which $x$ has a positive value less than 5. In general, for the purpose of the present invention, it is desirable that $x$ have a value within the range of about 2 to 3. If desired, a trivalent antimony compound such as an antimony trihalide may also be present.

The proportions of catalyst may vary within relatively wide limits depending largely upon the nature of the reactants and products desired, but it has been noted that very efficient fluorination may be effected with only relatively small amounts of catalyst. Generally speaking, very desirable results may be obtained with the use of an amount of catalyst corresponding to about 0.4 to 10.0% by weight of the material treated. When both phosphorus pentachloride and a pentavalent antimony fluoro chloride of the character previously described are employed as catalysts, very advantageous results are obtained in the use of about 1-2% phosphorus pentachloride and about 0.4-5.0% of the pentavalent antimony compound based upon the weight of material treated.

A free halogen such as chlorine may be present or may be added at any time during the fluorination reaction. It is desirable to have a free halogen present when substitution of hydrogen by the halogen takes place, and when the pentavalent antimony catalyst is reduced to trivalent form.

The term "hydrogen fluoride", unless otherwise indicated, is intended to include and cover not only the pure product but also hydrogen fluoride or hydrofluoric acid which may contain small amounts of impurities as, for example, water.

The fluorination reaction is normally carried out with the organic halogen derivative in liquid phase, and the catalyst dissolved or suspended therein. When the catalyst is not completely soluble in the halogen compound the use of agitation is of special advantage. On account of the relatively low freezing and high boiling points of the various organic halogen derivatives which may be fluorinated in accordance with the invention, little difficulty is experienced in maintaining the reaction mass in liquid condition. If desired, the fluorination may be effected in the presence of a relatively inert solvent or suspension media such as, for example, a fluorinated compound which is liquid at the temperatures employed. Hydrogen fluoride may be introduced as a liquid but is preferably passed into the reaction zone as a vapor.

Where the catalyst contains an antimony halide it may be desirable to provide means for preventing loss of the catalyst by volatilization. This may be effected, for example, by scrubbing the evolved reaction gases with a portion of the organic halide derivative to be fluorinated. This scrubbing liquid may also serve as a means of returning incompletely fluorinated compounds to the reaction zone. In general, it is preferable to cool the scrubbing liquid. It may be returned to the reaction zone intermittently or continuously as desired.

The proportions of reactants contacted with the catalyst may vary within relatively wide limits depending largely upon the nature of the reactants, the condition of operation and the results desired. Stoichiometrically, one equivalent of hydrogen fluoride corresponds to one equivalent of replaceable halogen in the compound to be fluorinated. In general, an excess of hydrogen fluoride favors the introduction of a larger number of fluorine atoms and an excess of the organic halogen compound favors the introduction of a smaller number of fluorine atoms. In practice, it is preferable to introduce the catalyst into the organic halogen derivative and then pass in the hydrogen fluoride.

The process may be operated continuously or intermittently. The reaction and the separation or isolation of the products may be carried out simultaneously or in separate steps. If the process is operated continuously the temperature should preferably be so adjusted as to allow vaporization of the product but not of the raw material. The evolved vapors may then be recovered continuously or intermittently in any suitable manner, for example, by liquefaction in a condenser maintained at a suitable temperature. Acidic gases may be removed from the evolved vapors by passing them through reagents suitable for the removal of such substances, as for example, relatively dilute aqueous solutions of alkali metal hydroxides.

The temperature at which the reaction is effected may be varied over a wide range, depending largely upon the nature of the compound to be fluorinated, the catalyst, the results desired and other conditions of reaction. It is desirable, however, to carry out the reaction at a temperature below that at which decomposition of the reactants and/or products occurs. The reaction may take place actively at the ordinary temperature of the room and appreciably so at temperatures of approximately —10° C. The upper temperature limit is preferably such that the catalyst and raw material do not volatilize. In general, for the fluorination of benzo-trichloride, benzofluoro-dichloride and other toluene derivatives, containing halogens in the side chain, it is preferable to employ temperatures within the range of about 0 to 20° C. It will be understood that these temperatures are preferred temperatures for the conditions and reactants described and do not represent the minimum or maximum temperatures at which reaction will occur.

The pressure may be atmospheric, subatmospheric or superatmospheric and, in general, may be adapted to the boiling temperatures of the components or products. For the production of high boiling products, the use of subatmospheric pressures may be found to be advantageous, particularly if the process is operated continuously.

The products of the invention are useful for various commercial purposes. Fluorinated derivatives of benzo trichloride and ring-substituted benzo-trichloride are particularly valuable for use as dye intermediates. In general, moreover, since the products of the invention are relatively high boiling, they are generally applicable for use as solvents and reaction media. Many of the products investigated have been found to be very desirable in that they are substantially non-inflammable, non-corrosive and non-toxic.

The invention is particularly advantageous in that it offers a flexible, practical and economical method of producing fluorinated products of the character herein described. One of the advantages of the invention is that the process may be operated with a relatively small amount of catalyst and the reaction proceeds smoothly and easily without undesirable side reactions such as the formation of tarry by-products. Furthermore, the use of small amounts of catalyst reduces the cost of operation and the size of equipment necessary.

As many apparent and widely different embodiments of this invention may be made without departing from the spirit thereof, it is to be understood that we do not limit ourselves to the foregoing examples or description except as indicated in the following claims.

We claim:

1. In a process of producing organic fluorine compounds, the step which comprises reacting a fluorinating agent with a compound containing at least one acyclic carbon atom, having attached thereto an aromatic radical and at least one halogen atom other than fluorine, in the presence of a phosphorus halide.

2. In a process of producing organic fluorine compounds, the step which comprises reacting a fluorinating agent with a compound containing at least one acyclic carbon atom, having attached thereto an aryl group and at least one halogen atom other than fluorine, in the presence of a phosphorus halide and a pentavalent antimony compound.

3. In a process of producing organic fluorine compounds, the step which comprises reacting hydrogen fluoride with a compound containing at least one acyclic carbon atom, having attached thereto an aryl group and at least one halogen atom other than fluorine, in the presence of a small amount of a fluorinating catalyst.

4. The process of producing organic fluorine compounds which comprises reacting hydrogen fluoride with a compound containing at least one acyclic carbon atom, having attached thereto an aryl group and at least one halogen atom other than fluorine, in the presence of a phosphorus halide.

5. The process of producing organic fluorine compounds which comprises reacting hydrogen fluoride with a compound containing at least one acyclic carbon atom, having attached thereto an aryl group and at least one halogen atom other than fluorine, in the presence of phosphorus pentachloride.

6. The process of producing alphyl compounds containing fluorine which comprises reacting hydrogen fluoride with a compound containing at least one acyclic carbon atom having attached thereto an aryl radical and three halogen atoms, at least one of which is a halogen other than fluorine, in the presence of a phosphorus halide and a pentavalent antimony halide containing a halogen other than fluorine.

7. The process of producing alphyl compounds containing fluorine which comprises reacting hydrogen fluoride with a compound containing at least one acyclic carbon atom having attached thereto an aromatic radical of the benzene series and three halogen atoms, at least one of which is a halogen other than fluorine, in the presence of a phosphorus halide and a pentavalent antimony halide containing a halogen other than fluorine.

8. The process of producing alphyl compounds containing fluorine which comprises reacting hydrogen fluoride with a compound containing acyclic carbon atom having attached thereto an aromatic radical of the benzene series and three chlorine atoms, in the presence of a phosphorus halide and a pentavalent antimony halide containing a halogen other than fluorine.

9. In a process of producing ring-halogenated alphyl compounds containing fluorine, the step which comprises reacting hydrogen fluoride with a compound containing an acyclic carbon atom having attached thereto three halogen atoms, at least one of which is a halogen other than fluorine and an aromatic radical of the benzene series, in the presence of a phosphorus halide, a pentavalent antimony halide containing a halogen other than fluorine, and added free halogen.

10. The process of producing alphyl compounds containing fluorine which comprises reacting hydrogen fluoride with a compound containing an acyclic carbon atom having attached thereto three halogen atoms, at least one of which is a halogen other than fluorine, and a phenyl radical which may contain substituents selected from the group consisting of alkyl, halogen alkyl, and halogens, in the presence of a small amount of phosphorus pentachloride and an antimony halide having the empirical formula $$SbF_xCl_{5-x}$$

in which $x$ is a positive value less than 5.

11. The process of producing fluorinated toluene derivatives which comprises reacting hydrogen fluoride with a halogenated toluene containing halogen atoms other than fluorine in the side chain, in the presence of phosphorus pentachloride.

12. The process of producing benzo-trifluoride which comprises reacting benzo-trichloride with hydrogen fluoride in the presence of a small amount of phosphorus pentachloride and an antimony halide having the empirical formula $$SbF_xCl_{5-x}$$

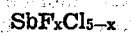

in which $x$ is a positive value less than 5.

13. The process of producing benzo-trifluoride which comprises agitating benzo-trichloride with in excess of about three molecular equivalents of hydrogen fluoride at a temperature within the range of about 0 to 20° C. in the presence of about 1 to 2% of phosphorus pentachloride and 0.4 to 5.0% of an antimony halide having the empirical formula $$SbF_xCl_{5-x}$$

in which $x$ is a positive value less than 5.

14. The process of producing 2-chloro-1,3-di-(trifluoro-methyl)-benzene which comprises reacting hydrogen fluoride with 2-chloro-1,3-di-(trifluoro-methyl)-benzene in the presence of phosphorus pentachloride and an antimony halide having the empirical formula $$SbF_xCl_{5-x}$$

in which $x$ is a positive value less than 5.

15. The compound having the formula:

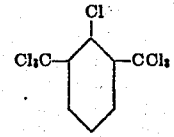

16. The compound having the formula:

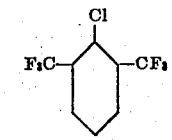

17. An aromatic compound of the formula:

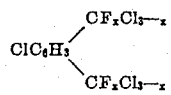

in which $x$ is a positive value not larger than 3.

18. An aromatic compound of the formula:

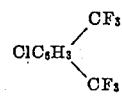

19. In a process of producing organic fluorine compounds, the step which comprises reacting together in liquid phase hydrogen fluoride with a compound containing at least one acyclic carbon atom having attached thereto at least one halogen atom other than fluorine and an aromatic radical, in the presence of a small amount of an antimony halide fluorinating catalyst.

20. In a process of producing organic fluorine compounds, the step which comprises reacting together in liquid phase hydrogen fluoride and a halogenated hydrocarbon containing at least one acyclic carbon atom having attached thereto at least one halogen atom other than fluorine and an aromatic radical, in the presence of a small amount of an antimony fluorinating catalyst.

21. In a process of producing organic fluorine compounds, the step which comprises reacting hydrogen fluoride with a di-(trichloromethyl)-benzene in the presence of a pentavalent antimony halide.

22. In a process of producing organic fluorine compounds, the step which comprises reacting hydrogen fluoride with a di-(trichloromethyl)-benzene in the presence of a phosphorus halide.

23. In a process of producing organic fluorine compounds, the step which comprises reacting hydrogen fluoride with a di-(trichloromethyl)-benzene in the presence of a phosphorus halide and a pentavalent antimony halide.

24. In a process of producing fluorinated toluene derivatives containing fluorine in the side chain and chlorine atoms in the phenyl nucleus, the step which comprises reacting a chloro-(trichloromethyl)-benzene with hydrogen fluoride in the presence of a pentavalent antimony halide.

25. In a process of producing fluorinated toluene derivatives containing fluorine in the side chain and chlorine atoms in the phenyl nucleus, the step which comprises reacting a chloro-(trichloromethyl)-benzene with hydrogen fluoride in the presence of a pentavalent antimony halide and a phosphorus halide.

26. The process of claim 2 in which the fluorination reaction is effected in the presence of a free halogen to produce ring halogenated aromatic compounds containing fluorine in a side chain.

27. The process of producing halogenated alphyl hydrocarbons containing fluorine in a side chain which comprises effecting a halogenation other than a fluorination of an alphyl compound of the class consisting of alphyl hydrocarbons and ring halogenated alphyl hydrocarbons in the presence of a phosphorus halide, and fluorinating the crude reaction product containing a small amount of the phosphorus halide with hydrogen fluoride.

28. The process of producing halogenated alphyl hydrocarbons containing fluorine in a side chain which comprises chlorinating an alphyl compound of the class consisting of alphyl hydrocarbons and ring halogenated alphyl hydrocarbons in the presence of phosphorus pentachloride, and treating the crude reaction product containing a small amount of the phosphorus pentachloride with hydrogen fluoride in the presence of a small amount of a pentavalent antimony fluorochloride.

29. The process of producing ring chlorinated alphyl hydrocarbons of the benzene series containing fluorine in a side chain which comprises chlorinating an alphyl hydrocarbon of the benzene series in the presence of phosphorus pentachloride, and treating the resultant product containing a small amount of phosphorus pentachloride with hydrogen fluoride and free chlorine in the presence of a small amount of a pentavalent antimony fluorochloride.

30. The process of producing a ring chlorinated di-(trifluoromethyl)-benzene which comprises chlorinating a chloro-dimethyl-benzene with chlorine in the presence of a small amount of phosphorus pentachloride at a temperature of about 165° C. to about 245° C. until a chloro-di-(trichloromethyl)-benzene is formed, and reacting said product containing a small amount of phosphorus pentachloride with hydrogen fluoride at a temperature between about 55° C. and about 90° C. with the addition of a small amount of a pentavalent antimony fluorochloride.

LEE CONE HOLT.
EDWIN LORENZO MATTISON.

CERTIFICATE OF CORRECTION.

Patent No. 2,005,712.  June 18, 1935.

LEE CONE HOLT, ET AL.

It is hereby certified that error appears in the printed specification of the above numbered patent requiring correction as follows: Page 4, second column, line 54, claim 14, for "(trifluoro-methyl)" read (trichloro-methyl); and that the said Letters Patent should be read with this correction therein that the same may conform to the record of the case in the Patent Office.

Signed and sealed this 16th day of July, A. D. 1935.

Leslie Frazer (Seal)   Acting Commissioner of Patents.